(12) United States Patent
Kurtz et al.

(10) Patent No.: US 9,255,542 B2
(45) Date of Patent: Feb. 9, 2016

(54) SYSTEM AND METHOD FOR COMPENSATING BIODIESEL FUEL

(71) Applicant: Ford Global Technologies, LLC, Dearborn, MI (US)

(72) Inventors: Eric Matthew Kurtz, Dearborn, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 13/758,901

(22) Filed: Feb. 4, 2013

(65) Prior Publication Data

US 2014/0222314 A1   Aug. 7, 2014

(51) Int. Cl.
| | |
|---|---|
| *F02D 41/00* | (2006.01) |
| *F02D 19/08* | (2006.01) |
| *F02D 41/40* | (2006.01) |
| *F02D 19/06* | (2006.01) |
| *F02D 41/14* | (2006.01) |
| *F02D 35/02* | (2006.01) |

(52) U.S. Cl.
CPC .......... *F02D 41/403* (2013.01); *F02D 19/0652* (2013.01); *F02D 19/085* (2013.01); *F02D 41/0025* (2013.01); *F02D 41/401* (2013.01); *F02D 19/0649* (2013.01); *F02D 19/087* (2013.01); *F02D 35/023* (2013.01); *F02D 41/005* (2013.01); *F02D 41/0007* (2013.01); *F02D 41/1454* (2013.01); *F02D 41/40* (2013.01); *F02D 41/402* (2013.01); *F02D 2200/0612* (2013.01); *Y02T 10/44* (2013.01)

(58) Field of Classification Search
CPC . F02D 41/403; F02D 41/401; F02D 41/0025; F02D 41/1454; F02D 41/40; F02D 41/402; F02D 19/0652; F02D 19/0649; F02D 19/0628; F02D 19/0634; F02D 19/0694; F02D 19/085; F02D 19/087
USPC ........... 123/435, 676; 60/295, 274; 73/114.16
See application file for complete search history.

(56) References Cited

U.S. PATENT DOCUMENTS

| | | | |
|---|---|---|---|
| 4,704,999 A * | 11/1987 | Hashikawa et al. ........... | 123/299 |
| 4,988,428 A * | 1/1991 | Iwakiri et al. ................. | 204/406 |
| 7,027,906 B2 | 4/2006 | Araki | |
| 7,647,161 B2 | 1/2010 | Haraguchi et al. | |
| 7,725,240 B2 | 5/2010 | Peron et al. | |
| 8,046,153 B2 | 10/2011 | Kurtz et al. | |
| 8,051,829 B2 | 11/2011 | Kurtz et al. | |
| 8,068,971 B2 | 11/2011 | Hamedovic et al. | |
| 8,175,789 B2 | 5/2012 | Kojima et al. | |
| 8,442,744 B2 | 5/2013 | Kurtz et al. | |
| 8,741,001 B1 * | 6/2014 | Schuetzle et al. ............... | 44/307 |
| 2004/0123585 A1 * | 7/2004 | Yamaguchi et al. ........... | 60/274 |

(Continued)

FOREIGN PATENT DOCUMENTS

GB        2502366 A  * 11/2013
WO   2011071608 A2      6/2011

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods and systems for adjusting a plurality of fuel injections supplied to a cylinder during a cycle of the cylinder are described. In one example, fuel amounts are adjusted in response to a biodiesel concentration in fuel supplied to an engine.

20 Claims, 3 Drawing Sheets

(56) References Cited

U.S. PATENT DOCUMENTS

| | | | |
|---|---|---|---|
| 2004/0231237 A1* | 11/2004 | Boer et al. | 44/446 |
| 2007/0055437 A1* | 3/2007 | Yamaguchi et al. | 701/104 |
| 2007/0079598 A1* | 4/2007 | Bailey et al. | 60/278 |
| 2007/0151542 A1* | 7/2007 | Yamaguchi et al. | 123/299 |
| 2008/0000450 A1 | 1/2008 | Serra et al. | |
| 2008/0040020 A1* | 2/2008 | Henein | 701/109 |
| 2008/0243358 A1* | 10/2008 | Kojima et al. | 701/102 |
| 2009/0024303 A1 | 1/2009 | Schneider et al. | |
| 2009/0223485 A1* | 9/2009 | Hamedovic et al. | 123/435 |
| 2009/0292447 A1* | 11/2009 | Yamaguchi et al. | 701/103 |
| 2010/0168984 A1* | 7/2010 | Fournel et al. | 701/103 |
| 2010/0204905 A1* | 8/2010 | Taniguchi | 701/103 |
| 2010/0307140 A1* | 12/2010 | Viola et al. | 60/286 |
| 2011/0072795 A1* | 3/2011 | Kerns et al. | 60/285 |
| 2011/0077847 A1* | 3/2011 | Barr et al. | 701/113 |
| 2011/0093181 A1 | 4/2011 | Ciaravino et al. | |
| 2011/0162628 A1* | 7/2011 | Kurtz et al. | 123/672 |
| 2011/0166767 A1* | 7/2011 | Kurtz et al. | 701/103 |
| 2011/0173957 A1 | 7/2011 | Funk | |
| 2012/0031384 A1* | 2/2012 | Haskara et al. | 123/703 |
| 2012/0145122 A1 | 6/2012 | Kurtz et al. | |
| 2012/0291529 A1* | 11/2012 | Ciaravino et al. | 73/61.43 |
| 2013/0024094 A1* | 1/2013 | Shaver et al. | 701/104 |
| 2013/0298526 A1* | 11/2013 | Wang et al. | 60/274 |

\* cited by examiner

SYSTEM AND METHOD FOR COMPENSATING BIODIESEL FUEL

BACKGROUND/SUMMARY

Diesel fuel may be delivered to customers with varying concentrations of biodiesel. Some diesel fuel may contain no biodiesel while other diesel fuel may contain 20% biodiesel. Consequently, a concentration of biodiesel in fuel stored on board a vehicle may change depending on fuel supplied to the vehicle during refilling and fuel stored on board the vehicle before refilling.

Biodiesel has a higher concentration of oxygen that is carried within the fuel as compared to fossil based diesel fuel. Biodiesel also has a lower energy density as compared to fossil based diesel fuel so that additional biodiesel may have to be supplied to an engine to produce an equivalent amount of power as compared to when fossil based diesel fuel is combusted. Consequently, when biodiesel is combusted in an engine, an increased driver demand torque to compensate for the lower energy content of biodiesel may increase boost pressure, injection pressure, and lower EGR amount, thereby increasing NOx emissions. Therefore, engine fuel economy and emissions may degrade if biodiesel in diesel fuel is not detected and compensated.

The inventors herein have recognized the above-mentioned disadvantages and have developed a method, comprising: adjusting an amount of fuel injected in response to a biodiesel concentration in fuel supplied to an engine; and adjusting an amount of fuel injected in pilot fuel injections and an amount of fuel injected in a main fuel injection in response to the biodiesel concentration, the amount of the main fuel injection increasing at a faster rate than the amount of fuel injected during the pilot fuel injections.

By adjusting an amount of fuel that is injected to engine cylinders and amounts of fuel that are injected during pilot and main fuel injections in response to a biodiesel concentration, it may be possible to reduce engine NOx emissions and improve fuel economy. In particular, a decrease in fuel economy and NOx emission observed when combusting biodiesel may be exchanged for an increase in particulate emissions which may decrease when combusting biodiesel. Further, urea may be conserved via when the method described herein is followed.

The present description may provide several advantages. Specifically, the approach may reduce engine emissions when biodiesel is combusted. In addition, the approach may also increase fuel economy as compared to operating an engine combusting biodiesel with conditions that are similar to combusting fossil based diesel fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
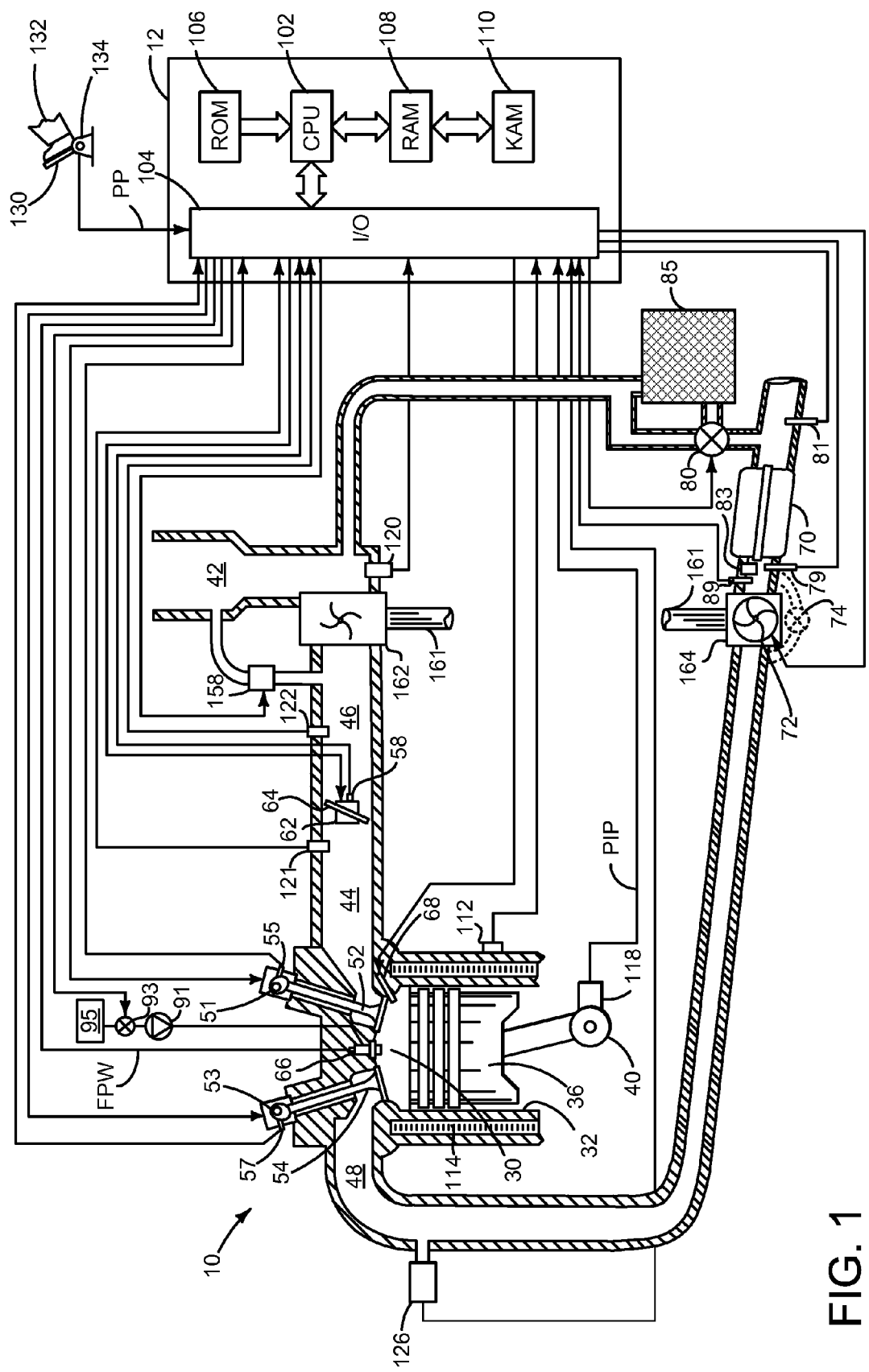
FIG. 1 shows a schematic depiction of an engine.
Figure 2:
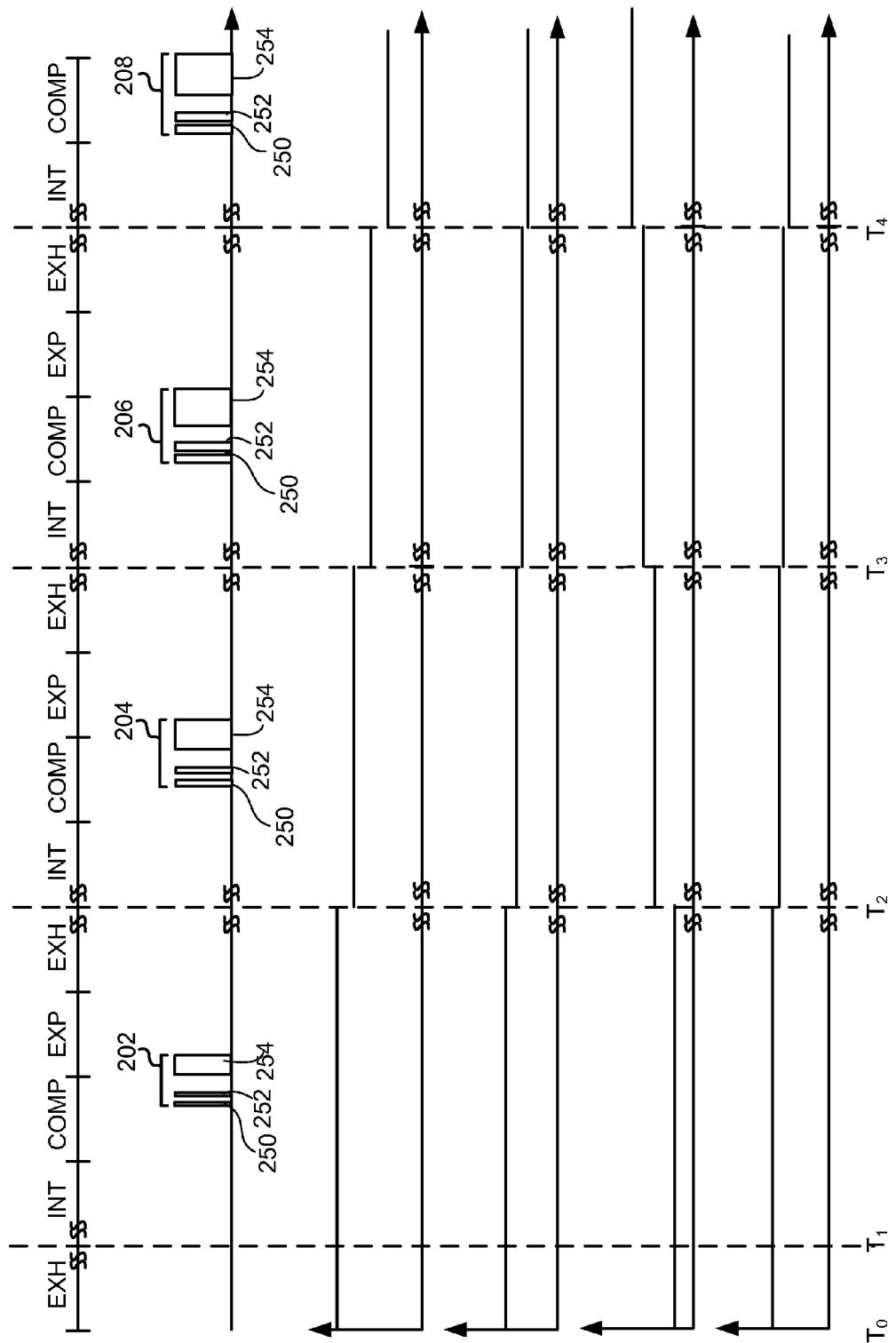
FIG. 2 shows signals of interest during conditions where varying concentrations of biodiesel fuel are combusted.

The present description is related to compensating combusting for fuels that have varying concentrations of biodiesel. FIG. 1 shows one example of a boosted diesel engine where the method of FIG. 3 may adjust engine actuators to improve engine emissions, performance, and/or fuel economy. FIG. 2 shows an example of simulated fuel injection timings to compensate for combusting fuels that have different concentrations of biodiesel.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel automatically ignites when piston 36 is near top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF). Fuel may be injected via injector 89 upstream of emissions device 70 to provide an exothermic reaction. Upstream temperature sensor 79 and downstream temperature sensor 81 provide exhaust gas temperature measurements for determining the change in exhaust gas temperature across emissions device 70. Alternatively, hydrocarbon combustor 83 includes a fuel injector and a glow plug for heating emissions device 70.

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: a compression ignition engine including a combustion chamber; a fuel injector directly injecting fuel into the combustion chamber; and a control system including a computer program stored in a non-transitory medium including executable instructions to inject fuel to a cylinder including pilot fuel injections, a main fuel injection, and post combustion fuel injections in response to a biodiesel concentration of fuel supplied to the engine.

In one example, the engine system further comprises additional instructions to estimate the biodiesel concentration in response to a temperature during diesel particulate filter regeneration. The engine system further comprises additional instructions to estimate the biodiesel concentration in response to output of an oxygen sensor. The engine system further comprises additional instructions to estimate the biodiesel concentration in response to output of a NOx sensor. The engine system further comprises additional instructions to estimate the biodiesel concentration in response to output of a cylinder pressure sensor. The engine system further comprises additional instructions to advance fuel injection timing in response to an increasing biodiesel concentration. The engine system further comprises additional instructions to estimate biodiesel concentration in response to a fuel filling event.

Referring now to FIG. 2, signals of interest during a time when concentration of biodiesel in fuel supplied to an engine is increased is shown. The signals and sequences of FIG. 2 may be provided by the system shown in FIG. 1 executing the method of FIG. 3. An engine is operated at substantially the same speed and torque demand for all cylinder cycles shown so that fuel adjustments and effects of the fuel adjustments may be illustrated under similar conditions. Although fuel injection for cylinder number one is only shown, fuel injection for other engine cylinders is performed similarly. Further, the fuel timing and amounts are merely for illustrative purposes and are not intended to limit the scope or breadth of the description.

The first plot from the top of FIG. 2 represents cylinder stroke of one cylinder of an engine. The X axis is broken into a series of segments that identify the cylinder stroke that cylinder number one is on as time proceeds from the left side of the figure to the right side of the figure. Exhaust stroke is abbreviated EXH while intake, compression, and expansion strokes are abbreviated by INT, COMP, and EXP respectively. Between vertical time markers $T_1$-$T_4$, breaks in time are indicated via SS markers along the X axis. The breaks in time may be over several cylinder cycles or over an extended period of time. Thus, FIG. 2 shows a progression over time or cylinder cycles of changing signals.

The second plot from the top of FIG. 2 represents fuel injection timing during a cylinder cycle. The pulse widths 250-254 vary in width and the width is an indication of an amount of fuel injected in the pulse. The wider the pulse is the larger the amount of fuel that is injected into the cylinder during the pulse.

The third plot from the top of FIG. 2 represents fuel pressure of fuel that is injected to a cylinder at the timings shown. The Y axis represents fuel pressure and fuel pressure increases in a direction of the Y axis arrow. The X axis represents time and time increases from the left to the right side of the figure.

The fourth plot from the top of FIG. 2 represents boost pressure in a boost chamber downstream of a compressor supplying air to the engine. Boost pressure increases in the direction of the Y axis arrow. The X axis represents time and time increases from the left to the right side of the figure.

The fifth plot from the top of FIG. 2 represents biodiesel concentration in fuel supplied to the engine via fuel injection. The biodiesel concentration increases in the direction of the Y axis arrow. The X axis represents time and time increases from the left to the right side of the figure.

The sixth plot from the top of FIG. 2 represents exhaust gas recirculation (EGR) amount. The EGR amount (e.g., mass) increases in the direction of the Y axis arrow. The X axis represents time and time increases from the left to the right side of the figure.

At the time $T_0$, the engine is operating in a cylinder cycle with a fuel that includes a first lower concentration of biodiesel. The fuel injection pressure is at a higher level as is the boost pressure. The EGR amount is at a lower level.

At time $T_1$, a new cylinder cycle begins and the engine continues to operate with a fuel that includes a first lower concentration of biodiesel. Fuel is injected in a first amount that extends for duration 202. The fuel injection is comprised of two pilot fuel injections 250 and 252 as well as a main fuel injection 254. The two pilot fuel injections are short in duration and control combustion noise and affect particulate matter formation in the cylinder. Combusting diesel fuel that does not contain biodiesel may provide increased particulate matter formation as compared to combusting diesel fuel that includes biodiesel during similar conditions. The fuel pressure, boost pressure, EGR amount, and biodiesel concentration remain at the level shown at time $T_0$.

At the time $T_2$, the diesel fuel concentration of biodiesel has increased. The biodiesel concentration of a fuel may be determined as described in FIG. 3. The fuel injection timing is adjusted in response to the increased biodiesel concentration. In particular, the amount of fuel is increased so as to compensate for a reduction in energy content of the biodiesel. The start of injection timing is also advanced to improve engine torque so that less additional fuel may need to be injected to compensate for the change in fuel energy density. The pilot injection amount relative to the main injection amount may be further increased when start of injection time is advanced. The pilot injection fuel amounts are adjusted by a first biodiesel adjustment factor. The main injection fuel amount is adjusted by a second biodiesel adjustment factor, the second biodiesel adjustment factor greater than the first biodiesel adjustment factor. Consequently, the pilot fuel injection amounts are increased by less fuel than the main fuel injection amount. For example, the proportion of fuel in the pilot injections decreases and the proportion of fuel in the main injection increases as the biodiesel concentration increases. By adjusting pilot fuel injections to increase in a smaller proportion than the main fuel pulse, ignition timing may be delayed allowing combustion noise to increase to a level produced when combusting fuel with a lower concentration of biodiesel.

The boost pressure and fuel pressure are also reduced in response to an increasing concentration of biodiesel in diesel fuel supplied to the engine. Biodiesel may produce less particulate matter during combustion so that engine air-fuel ratio and boost may be reduced without exceeding particulate emission levels. Consequently, engine pumping losses may be decreased so that engine fuel economy may be increased. Additionally, decreasing boost may also increase exhaust gas temperature to improve efficiency of after treatment devices. The EGR amount is decreased in response to the increasing concentration of biodiesel to maintain the same intake oxygen concentration as during combustion of diesel fuel having a lower concentration of biodiesel. Lowering the boost pressure decreases intake $O_2$ concentration and allows a decreased EGR amount to maintain the same intake $O_2$ concentration as during combustion of fossil based diesel fuel. Further, the fuel injection pressure is reduced in response to the increase in biodiesel concentration to reduce parasitic engine work even though particulate emissions may increase to a level near particulate emissions when the engine is combusting diesel fuel having a lower concentration of biodiesel.

At the time $T_3$, the diesel fuel concentration of biodiesel has increased further. The amount of fuel injected is increased again so as to compensate for the reduction in energy content of the biodiesel. The injection timing is also advanced to take advantage of a higher cetane number of the biodiesel. The pilot injection fuel amounts are adjusted by a first biodiesel adjustment factor. The main injection fuel amount is adjusted by a second biodiesel adjustment factor, the second biodiesel adjustment factor greater than the first biodiesel adjustment factor. Consequently, the pilot fuel injection amounts are increased by less fuel than the main fuel injection amount. The fuel injection duration 206 is increased as compared to the fuel injection durations 202 and 204.

The boost pressure and fuel pressure are also reduced again in response to an increasing concentration of biodiesel in diesel fuel supplied to the engine. The EGR amount is also reduced so that substantially the same engine intake O2 concentration is present as compared to when fossil based diesel fuel is combusted. Additionally, the fuel injection pressure is reduced in response to the increase in biodiesel concentration to reduce parasitic engine work even though particulate emissions may increase to a level near particulate emissions when the engine is combusting diesel fuel having a lower concentration of biodiesel.

At the time $T_4$, the diesel fuel concentration of biodiesel has increased further. The amount of fuel injected is increased again so as to compensate for the reduction in energy content of the biodiesel. The injection timing is also advanced to take advantage of a higher cetane number of the biodiesel. The pilot injection fuel amounts are adjusted by a first biodiesel adjustment factor. The main injection fuel amount is adjusted by a second biodiesel adjustment factor, the second biodiesel adjustment factor greater than the first biodiesel adjustment factor. Consequently, the pilot fuel injection amounts are increased by less fuel than the main fuel injection amount. The fuel injection duration 208 is increased as compared to the fuel injection durations 202, 204, and 206.

The boost pressure, EGR amount, and fuel pressure are also reduced again in response to an increasing concentration of biodiesel in diesel fuel supplied to the engine. Additionally, the fuel injection pressure is reduced in response to the increase in biodiesel concentration to reduce parasitic engine work even though particulate emissions may increase to a level near particulate emissions when the engine is combusting diesel fuel having a lower concentration of biodiesel.

In this way, fuel amounts between a plurality of fuel injections provided to a cylinder during a cylinder cycle may be adjusted over a number of combustion events to compensate for an increasing concentration of biodiesel in the diesel fuel supplied to the engine. Further, the start of fuel injection time is advanced as biodiesel concentration increases to take advantage of a higher cetane number for biodiesel.

Figure 3:
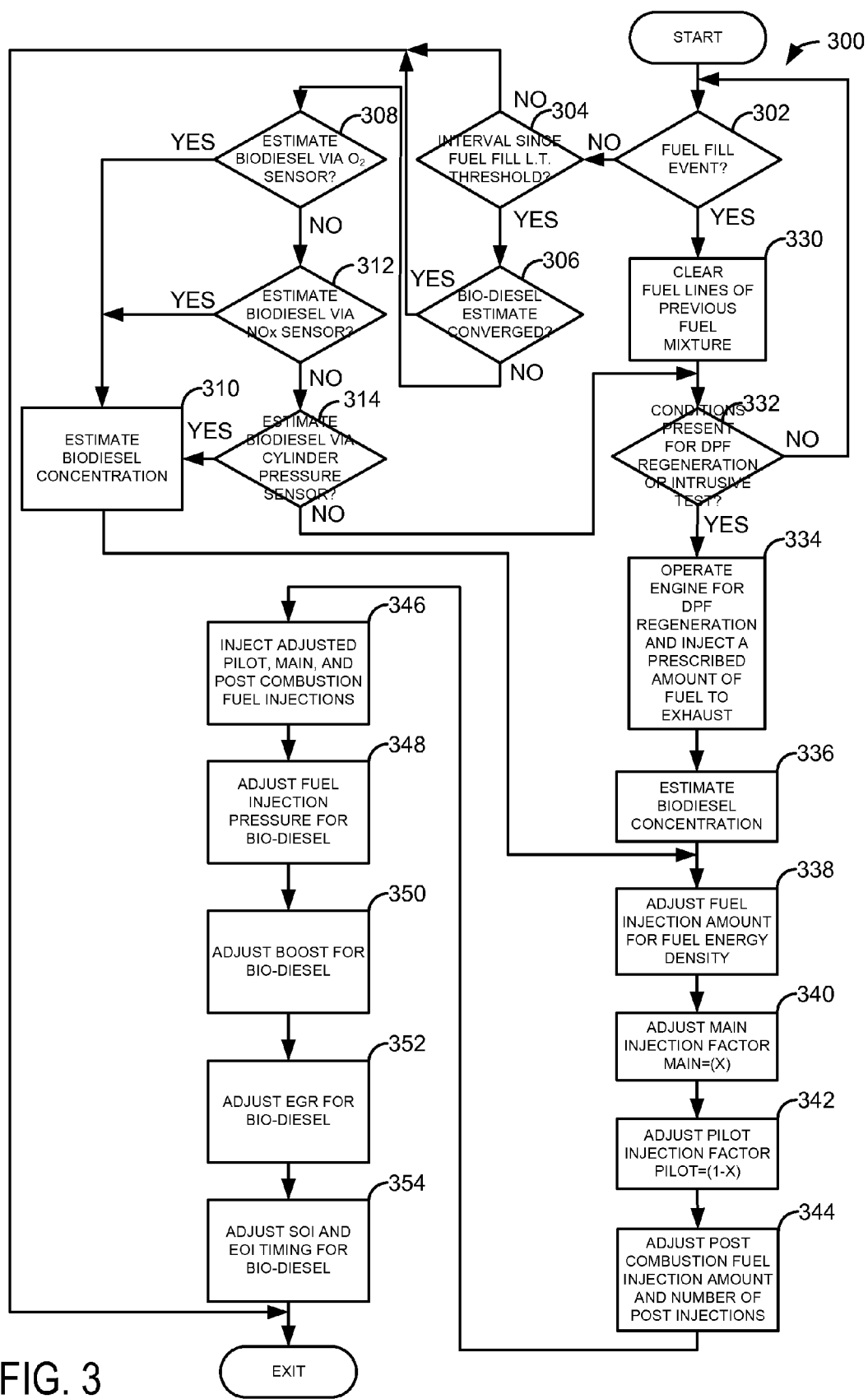
FIG. 3 shows a flowchart of an example method for detecting and compensating for varying levels of biodiesel.

Referring now to FIG. 3, a method for compensating for biodiesel concentration in diesel fuel is shown. The method of FIG. 3 may be stored as executable instructions in non-transitory memory in a system such as shown in FIG. 1.

At 302, method 300 judges whether or not a fuel filling event has occurred. A fuel filling event may be determined based on a change in a fuel tank level indicted by a fuel sensor. If method 300 judges that a fuel filling event has occurred, the answer is yes and method 300 proceeds to 330. Otherwise, the answer is no and method 300 proceeds to 304.

At 304, method 300 judges whether or not an interval since a last fuel fill is less than a threshold. The interval may be a time interval, an amount of fuel consumed by the engine, a distance traveled by the vehicle, or another vehicle related interval. If method 300 judges than the interval since the last fuel fill is less than a threshold, the answer is yes and method 300 proceeds to 306. Otherwise, the answer is no and method 300 proceeds to exit.

At 306, method 300 judges whether or not the biodiesel concentration estimate has converged to a value. In one example, method 300 judges that a biodiesel concentration has converged to a value when the biodiesel concentration estimate changes by less than a predetermined amount over a predetermined time interval. The time interval may begin upon indication of a fuel refill. If method 300 judges that the biodiesel concentration estimate has converged, the answer is yes and method 300 proceeds to exit. Otherwise, the answer is no and method 300 proceeds to 308.

At 308, method 300 judges whether or not an oxygen sensor is present in the engine exhaust system. An oxygen sensor may be present when a variable in memory is asserted. If method 300 judges that an oxygen sensor is present the answer is yes and method 300 proceeds to 310 where biodiesel concentration is determined via the oxygen sensor. Otherwise, the answer is no and method 300 proceeds to 312.

At 312, method 300 judges whether or not a NOx sensor is present in the engine exhaust system. A Nox sensor may be present when a variable in memory is asserted. If method 300 judges that a NOx sensor is present the answer is yes and method 300 proceeds to 310 where biodiesel concentration is determined via the NOx sensor. Otherwise, the answer is no and method 300 proceeds to 314.

At 314, method 300 judges whether or not a cylinder pressure sensor is present in the engine. A cylinder pressure sensor may be present when a variable in memory is asserted. If method 300 judges that a cylinder pressure sensor is present the answer is yes and method 300 proceeds to 310 where biodiesel concentration is determined via the cylinder pressure sensor. Otherwise, the answer is no and method 300 proceeds to 332.

In some examples, biodiesel concentration may be estimated via oxygen sensor, NOx sensor, cylinder pressure sensor, and exhaust gas exotherm or any combination of the previously mentioned sensor set even though FIG. 3 shows estimating biodiesel by solely relying on an exhaust gas exotherm and one of an oxygen sensor, NOx sensor, and cylinder pressure sensor. Further, if an exhaust oxygen sensor, NOx sensor, or cylinder pressure sensor is not deployed or is unavailable, biodiesel concentration of fuel may be estimated via the sensors that are deployed and available.

In one example, where an oxygen sensor, NOx sensor, cylinder pressure sensor and exhaust temperature sensors are available, and estimate of a fuel's biodiesel fraction may be determined via averaging the individual biodiesel concentrations that are based on the respective available sensors. For example, if oxygen, NOx, and temperature sensors are available, three estimates of biodiesel concentration, the first estimate based on oxygen sensor output, the second estimate based on NOx sensor output, and the third estimate based on temperature change across an emissions device may be averaged to estimate the biodiesel concentration when each of the three estimates are within a predetermined range of the other biodiesel concentration estimates. If one or more of the estimates is outside of the predetermined biodiesel concentration range, the biodiesel concentration may be based on the biodiesel concentrations that are within the predetermined range. Similarly, when fewer or more sensors are available for estimating biodiesel concentration, the estimated biodiesel concentration may be based on sources of information that produce biodiesel concentration estimates that are within the predetermined concentration range.

At 310, method 300 estimates the biodiesel concentration in fuel delivered to the engine. If an oxygen sensor is present, method 300 determines an exhaust gas oxygen concentration and the oxygen concentration is used to index a table or function that includes empirically determined values of estimated biodiesel concentration based on the present engine operating conditions and the sensed exhaust gas oxygen concentration. If an exhaust gas oxygen concentration is increasing as compared to an exhaust gas concentration provided by combusted fossil based diesel fuel, the biodiesel concentration level is increased.

On the other hand, if a NOx sensor is present, method 300 determines an exhaust gas NOx concentration and the NOx concentration is used to index a table or function that includes empirically determined values of estimated biodiesel concentration based on the present engine operating conditions and the sensed exhaust gas NOx concentration. If an exhaust gas NOx concentration is increasing as compared to an exhaust gas concentration provided by combusted fossil based diesel fuel, the biodiesel concentration level is increased.

If a cylinder pressure sensor is present, method 300 determines a cylinder indicated mean effective pressure (IMEP) during a cylinder cycle and IMEP is used to index a table or function that includes empirically determined values of estimated biodiesel concentration based on the present engine operating conditions and the sensed peak cylinder pressure. If cylinder IMEP is decreased as compared to a cylinder IMEP provided by combusted fossil based diesel fuel, the biodiesel concentration level is increased. Method 300 proceeds to 338 after the biodiesel concentration is revised.

At 330, method 300 waits until an amount of fuel in the fuel lines has been consumed by the engine. Since the fuel lines contain older fuel from before the time fuel was added to the vehicle, the older fuel is purged from the fuel lines before an assessment of whether or not the added fuel changed the biodiesel fuel concentration in the fuel tank. In one example, method 300 delays proceeding until the engine has consumed an amount of fuel equivalent to the mass of fuel in the fuel lines. Method 300 proceeds to 332 after the fuel lines are cleared of older fuel.

At 332, method 300 judges whether or not conditions are desirable for diesel particulate filter (DPF) regeneration or if an intrusive biodiesel concentration test is requested. An intrusive biodiesel concentration request may be made when selected conditions are present. For example, an intrusive biodiesel test may be requested upon refilling a fuel tank. Alternatively, an intrusive test may be requested when biodiesel is determined via one or more of oxygen sensor, NOx sensor, or pressure sensors. DPF regeneration may be instigated in response to a fuel refilling event. Alternatively, the DPF regeneration may be instigated in response to a pressure drop across the DPF. If method 300 judges that conditions are present for DPF regeneration, the answer is yes and method 300 proceeds to 334. Otherwise, the answer is no and method 300 returns to 302. Alternatively, method 300 may exit when the answer is no.

At 334, method 300 operates the engine so as to regenerate the DPF. In one example, the engine may be throttled to increase engine exhaust gas temperature. Further, fuel may be injected to engine cylinders post combustion and before the cylinder's exhaust valves close. Thus, a prescribed amount of fuel is injected to the cylinders and exhausted to the exhaust system with little oxidation so that the fuel may be oxidized at the DPF. The fuel amount is based on an amount of heat expected to be produced by oxidizing fossil based diesel fuel at the DPF.

In another example, DPF regeneration may be initiated via injecting fuel directly into the exhaust system at a location upstream of an oxidation catalyst. In still other examples, DPF regeneration may be initiated via injecting fuel to a hydrocarbon combustor located upstream of the DPF. Method 300 proceeds to 336 after DPF regeneration begins.

At 336, method 300 estimates the biodiesel concentration fraction. In one example, temperatures upstream and downstream of an after treatment device (e.g., an oxidation catalyst) are monitored to determine the temperature change across the emissions device. For example, before hydrocarbons are injected to the exhaust system or introduced to the exhaust system via post combustion fuel injection to engine cylinders, the change in temperature across the emissions device is determined via subtracting the upstream temperature from the downstream temperature. If the temperature differential across the emission device is within an expected range, the engine and exhaust system are determined to be operating properly. If the temperature differential is out of range, the regeneration or intrusive test may be aborted. If the temperature differential is within range, fuel is introduced to the exhaust system via the cylinder or a fuel injector. The temperature differential across the emissions device is monitored and the temperature differential produced across the emissions device is compared to empirically determined temperatures that are based on providing fuels having different concentrations of biodiesel to the exhaust system during similar operating conditions. The present temperature differential across the emissions device is compared to empirically determined temperatures in a table or function and the table or function outputs a biodiesel concentration in response to the present temperature differential across the after treatment device. Alternatively, if fuel is introduced to the exhaust system and the temperature differential is out of range, the injected fuel amount may be increased until the temperature differential is in range and then the amount of fuel injected is used to index a table or function that outputs an estimate of biodiesel concentration.

In another example where only a single temperature sensor is available, method 300 monitors DPF temperature during regeneration and DPF temperature is used to index a table or function of empirically determined values representing biodiesel concentration in the fuel being combusted at the DPF during DPF regeneration. If the DPF temperature is less than expected, the biodiesel concentration estimate is increased. The table or function outputs an estimate biodiesel concentration of the fuel being combusted at the DPF. Thus, a biodiesel concentration estimate may be based off of a single exhaust gas temperature sensor. Method 300 proceeds to 338 after the biodiesel concentration estimate is increased.

At 338, method 300 adjusts the fuel injection amount for the energy density of the fuel being supplied to the engine for combustion. The energy density of biodiesel is less than the energy density of fossil based diesel fuel. Therefore, the amount of fuel injected to the engine for combustion is increased as the biodiesel concentration of fuel supplied to the engine increases. In one example, a base fuel amount is multiplied by a fuel factor to adjust the amount of fuel injected during a cylinder cycle. The fuel factor is varied as the concentration of biodiesel fuel supplied to the engine varies. For example, the fuel factor may be increased to increase the amount of fuel injected during a cylinder cycle when the concentration of biodiesel in fuel supplied to the engine increases. Likewise, the fuel factor may be decreased to decrease the amount of fuel injected during a cylinder cycle when the concentration of biodiesel in fuel supplied to the engine decreases. If the base fuel amount is comprised of pilot and a main injection, the amount of fuel in the pilot and main fuel injections is multiplied by the fuel factor. If the base fuel amount also includes fuel injections after the main fuel injection (e.g., post combustion injections), the amount of fuel after the main fuel injection is also multiplied by the fuel factor. Method 300 proceeds to 340 after the amount of fuel for combustion has been adjusted.

At 340, method 300 adjusts the amount of fuel injected in a main fuel injection (e.g., a fuel injection occurring in a cylinder cycle after pilot fuel injections) in response to biodiesel concentration. In one example, a main fuel injection multiplier X is multiplied by the amount of fuel to be injected during a cylinder cycle to determine a main fuel injection amount. The value of X may be limited to between 1 and 0. Further, in some examples, X may be limited to a value greater than 0.5 and less than or equal to 1 so that the main fuel pulse increases at a rate faster than the pilot fuel injections in response to increasing biodiesel concentration. The value of X for fossil based diesel fuel without biodiesel is less than the value of X for fuels that include biodiesel. Method 300 proceeds to 342 after the main fuel injection pulse width is adjusted in response to biodiesel concentration in fuel supplied to the engine.

At 342, method 300 adjusts the amount of fuel injected in pilot fuel injections (e.g., a fuel injections occurring in a cylinder cycle before a main fuel injections) in response to biodiesel concentration. In one example, a pilot fuel injection multiplier having a value of 1-X is multiplied by the amount of fuel to be injected during a cylinder cycle to determine an amount of fuel to be split up between pilot fuel injections. In some examples where X may be limited to a value greater than 0.5 and less than or equal to 1, the pilot fuel injection amounts increase in response to biodiesel concentrations at a rate that is slower than the rate the main fuel injection increases. Method 300 proceeds to 344 after the pilot fuel injection pulse widths are adjusted in response to biodiesel concentration in fuel supplied to the engine.

At 344, method 300 adjusts the amount of post combustion fuel injected during a cylinder cycle in response to the biodiesel concentration. In particular, the amount of fuel injected increases as the concentration of biodiesel increases so that a desired DPF temperature may be reached when DPF regeneration is requested. The amount of post combustion fuel injected during a cylinder cycle is increased proportionately to the concentration of biodiesel in fuel delivered to the cylinder increases. In one example, the biodiesel concentration estimate is used to index a table or function that outputs a post combustion fuel amount. Further, method 300 adjusts the number of post combustion fuel injections in a cylinder cycle in response to biodiesel concentration. In particular, method 300 increases the number of post combustion fuel injections in a cylinder cycle as the concentration of biodiesel in fuel delivered to the cylinder increases. By increasing the number of post combustion fuel injections during a cylinder cycle it may be possible to reduce cylinder wall wetting and cylinder wall degradation. Alternatively, the amount of post combustion fuel injected during a cylinder cycle is decreased as concentration of biodiesel in fuel delivered to the cylinder decreases. Likewise, the number of post combustion fuel injections delivered to a cylinder during a cycle of the cylinder decreases as the concentration of biodiesel in fuel delivered to the cylinder decreases. Method 300 proceeds to 346 after the post combustion fuel amount is adjusted.

At 346, method 300 injects the adjusted pilot and main fuel injections to the engine. Further, if DPF regeneration is requested, the post combustion fuel injections are injected during cylinder cycles between combustion events in respective cylinders and before exhaust valves of the respective cylinders close. The adjusted pilot and main fuel injections are output to fuel injectors of each cylinder. Method 300 proceeds to 348 after fuel injections are revised and output.

At 348, method 300 adjusts fuel injection pressure in response to biodiesel concentration. In one example, the biodiesel concentration estimate indexes a table or function that holds values of empirically determined fuel injection pressures. The fuel injection pressure decreases and biodiesel concentration in fuel supplied to the engine increases. The fuel injection pressure increases as the biodiesel concentration in fuel supplied the engine decreases. The fuel injection pressure may be reduced because particulate emissions may be reduced when combusting biodiesel as compared to combusting fossil based diesel fuel during similar conditions. Method 300 proceeds to 350 after the fuel injection pressure is adjusted in response to biodiesel concentration.

At 350, method 300 adjusts boost pressure in response to biodiesel concentration. In one example, the biodiesel concentration estimate indexes a table or function that holds values of empirically determined boost pressures. The boost pressure decreases and biodiesel concentration in fuel supplied to the engine increases. The boost pressure increases as the biodiesel concentration in the fuel supplied to the engine decreases. Method 300 proceeds to 352 after the boost pressure is adjusted in response to biodiesel concentration.

At 352, method 300 adjusts EGR in response to biodiesel concentration. In one example, the biodiesel concentration estimate indexes a table or function that holds values of empirically determined EGR amounts. The EGR amount increases as the biodiesel concentration in fuel supplied to the engine increases. The EGR amount decreases as the biodiesel concentration in fuel supplied the engine decreases. Method 300 proceeds to 354 after the EGR amount is adjusted in response to biodiesel concentration.

At 354, method 300 adjusts start of injection (SOI) timing and end of injection (EOI) timing in response to biodiesel concentration. In one example, the biodiesel concentration estimate indexes a table or function that holds values of empirically determined SOI and EOI adjustments. The SOI timing is advanced relative to crankshaft position as biodiesel concentration increases and the EOI timing is revised based on the amount of fuel injected. Method 300 proceeds to exit after the SOI and EOI times are adjusted in response to biodiesel concentration.

Thus, the method of FIG. 3 provides for an engine method, comprising: adjusting an amount of fuel injected in response to a biodiesel concentration in fuel supplied to an engine; and adjusting an amount of fuel injected in pilot fuel injections and an amount of fuel injected in a main fuel injection in response to the biodiesel concentration, the amount of the main fuel injection increasing at a faster rate than the amount of fuel injected during the pilot fuel injections. The method includes where the biodiesel concentration is estimated in response to a temperature during DPF regeneration.

In some examples, the method includes where the biodiesel concentration is estimated in response to an exhaust gas oxygen concentration. The method also includes where the biodiesel concentration is estimated in response to an exhaust gas NOx concentration. The method also includes where the biodiesel concentration is estimated in response to a pressure in a cylinder. The method includes where the fuel is injected to a cylinder. The method further comprises advancing timing of the pilot fuel injections in response to the biodiesel concentration.

The method of FIG. 3 also provides for an engine method, comprising: adjusting an amount of fuel injected to an engine in response to a biodiesel concentration estimated via a NOx sensor; and adjusting an amount of a main fuel injection at a faster rate than an amount of fuel injected during pilot fuel injections in response to the biodiesel concentration. The method further comprises decreasing a boost pressure in response to the biodiesel concentration increasing. The method further comprises decreasing a fuel injection pressure in response to the biodiesel concentration increasing.

In one example, the method further comprises increasing an EGR amount supplied to the engine in response to the biodiesel concentration increasing. The method further comprises advancing timing of the pilot fuel injections in response to the biodiesel concentration. The method further comprises increasing an amount of fuel injected during a cylinder cycle in response to the biodiesel concentration increasing.

As will be appreciated by one of ordinary skill in the art, the method described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine method, comprising:
adjusting an amount of fuel injected in response to a biodiesel concentration in fuel supplied to an engine;
adjusting an amount of fuel injected in pilot fuel injections and an amount of fuel injected in a main fuel injection in response to the biodiesel concentration, the amount of the main fuel injection increased according to a second adjustment factor at a faster rate than the amount of fuel injected during the pilot fuel injections according to a first adjustment factor, the second adjustment factor different from the first adjustment factor; and
increasing a total actual number of post combustion fuel injections in a cylinder cycle in response to the biodiesel concentration increasing.

2. The method of claim 1, where the biodiesel concentration is estimated in response to a temperature differential across an emissions device during DPF regeneration.

3. The method of claim 1, where the biodiesel concentration is estimated in response to an exhaust gas oxygen concentration.

4. The method of claim 1, where the biodiesel concentration is estimated in response to an exhaust gas NOx concentration.

5. The method of claim 1, where the biodiesel concentration is estimated in response to a pressure in a cylinder.

6. The method of claim 1, where the fuel is injected to a cylinder, and further comprising decreasing a boost pressure in response to the biodiesel concentration increasing.

7. The method of claim 1, further comprising advancing timing of the pilot fuel injections in response to the biodiesel concentration.

8. An engine method, comprising:
adjusting an amount of fuel injected to an engine in response to a biodiesel concentration estimated via an output of a NOx sensor;
adjusting an amount of a main fuel injection at a faster rate than an amount of fuel injected during pilot fuel injections via adjusting the main fuel injection according to a second adjustment factor and adjusting the pilot fuel injections according to a first adjustment factor, the second adjustment factor different from the first adjustment factor, in response to the biodiesel concentration; and
increasing a total actual number of post combustion fuel injections in a cylinder cycle in response to the biodiesel concentration increasing.

9. The method of claim 8, further comprising decreasing a boost pressure in response to the biodiesel concentration increasing.

10. The method of claim 8, further comprising decreasing a fuel injection pressure in response to the biodiesel concentration increasing.

11. The method of claim 8, further comprising increasing an EGR amount supplied to the engine in response to the biodiesel concentration increasing.

12. The method of claim 8, further comprising advancing timing of the pilot fuel injections in response to the biodiesel concentration.

13. The method of claim 8, further comprising increasing an amount of fuel injected during a cylinder cycle in response to the biodiesel concentration increasing.

14. An engine system, comprising:
a compression ignition engine including a combustion chamber;
a fuel injector directly injecting fuel into the combustion chamber; and
a control system including a computer program stored in a non-transitory medium including executable instructions to inject fuel to a cylinder including pilot fuel injections, a main fuel injection, and post combustion fuel injections in response to a biodiesel concentration of fuel supplied to the engine, where the pilot fuel injections are increased via a second adjustment factor, and where the main fuel injection is increased via a first adjustment factor, the second adjustment factor different from the first adjustment factor, and further instructions to increase a total actual number of the post combustion fuel injections in a cycle of the cylinder in response to the biodiesel concentration increasing.

15. The engine system of claim 14, further comprising additional instructions to estimate the biodiesel concentration in response to a temperature differential across a catalyst during diesel particulate filter regeneration.

16. The engine system of claim 14, further comprising additional instructions to estimate the biodiesel concentration in response to output of an oxygen sensor and increasing the total actual number of the post combustion fuel injections in the cylinder cycle in response to the biodiesel concentration increasing.

17. The engine system of claim 14, further comprising additional instructions to estimate the biodiesel concentration in response to output of a NOx sensor, and further comprising decreasing a boost pressure in response to the biodiesel concentration increasing.

18. The engine system of claim 14, further comprising additional instructions to estimate the biodiesel concentration in response to output of a cylinder pressure sensor.

19. The engine system of claim 14, further comprising additional instructions to advance fuel injection timing in response to an increasing biodiesel concentration.

20. The engine system of claim 14, further comprising additional instructions to estimate the biodiesel concentration in response to a fuel filling event.

* * * * *